April 22, 1958 G. RICHARDSON 2,831,958
BLADED ROTOR
Filed Dec. 1, 1955
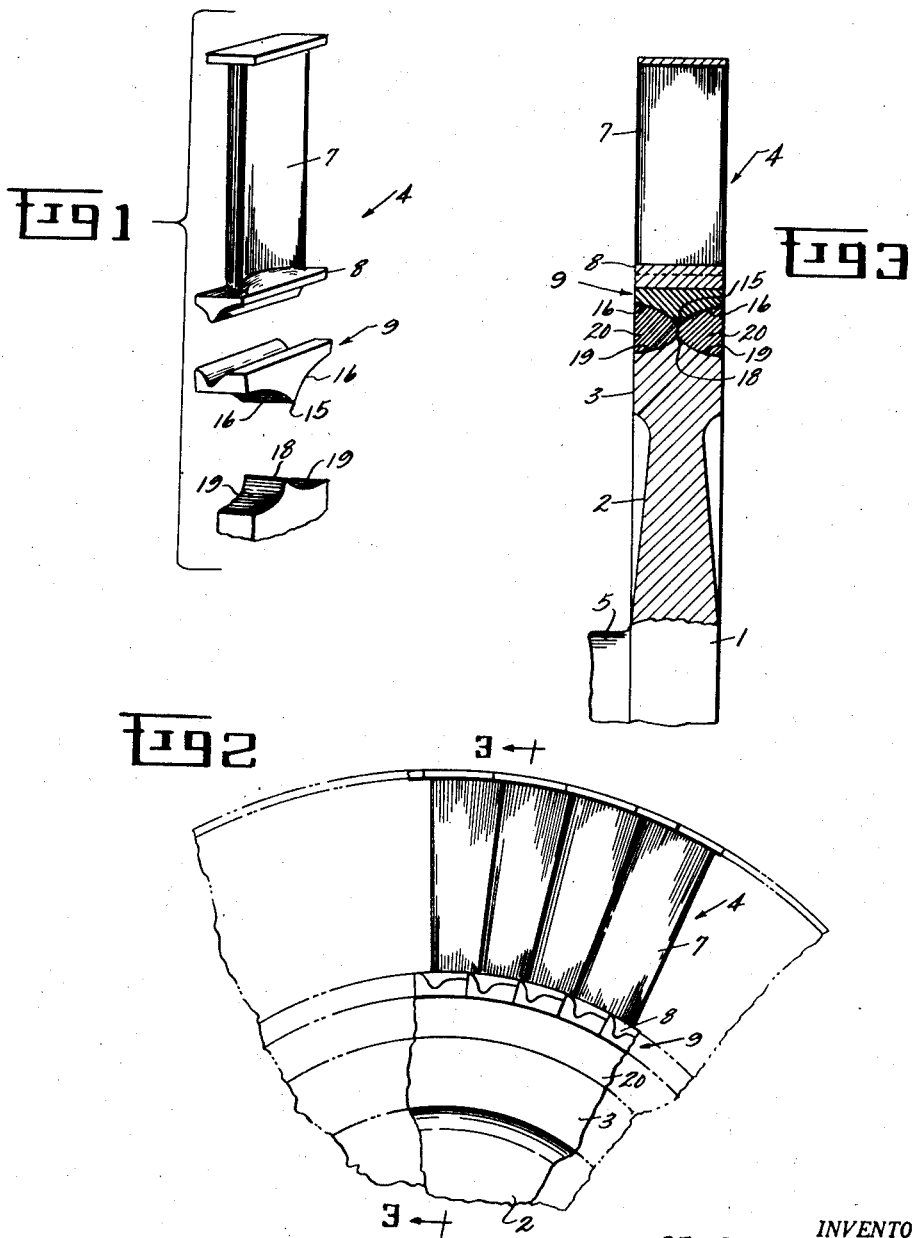
INVENTOR.
GEORGE RICHARDSON
BY
Edward M. Little
HIS ATTORNEY

United States Patent Office 2,831,958
Patented Apr. 22, 1958

2,831,958
BLADED ROTOR

George Richardson, Lynn, Mass., assignor to General Electric Company, a corporation of New York Application December 1, 1955, Serial No. 550,440

12 Claims. (Cl. 219—132)

This invention relates to bladed rotors such as are used in turbines, compressors, and the like. It finds a special utility in rotors for gas turbines such as, for example, turbosuperchargers wherein the blade elements, commonly called "buckets," are subjected to high temperatures and speeds.

It has been common practice in fabricating turbine wheels for turbosuperchargers and other high speed turbine wheels to fasten or anchor the buckets to the rim of the wheel by welding the bucket bases to the wheel rim. A preferred method for welding turbine buckets to a wheel is shown and described in U. S. Patent 2,454,580—Thielemann, which is assigned to the assignee of the present invention. One of the problems in practicing the welding method of a bucket attachment has been that those bucket materials which are suitable for high temperature use and also exhibit good forging or casting characteristics invariably have poor arc welding characteristics. Accordingly, it has not previously been possible to weld a forged or cast bucket of these materials to a turbine wheel without small cracks appearing in the weld. It is therefore an object of this invention to provide an improved method for joining a body of a material having poor arc welding characteristics to one of a material having good arc welding characteristics.

It is another object of the invention to provide a turbomachine bucket structure having an airfoil portion which may be easily forged or cast and a base portion which may be readily arc welded to a wheel rim.

Briefly these and other objects are accomplished by joining a body of a high temperature alloy having poor metal arc welding but good casting or forging characteristics to a body of an alloy having good metal arc welding characteristics by resistance flash welding and subsequently metal arc welding the portion of the body so formed composed of the alloy having good metal arc welding characteristics to another body of an alloy having good metal arc welding characteristics.

The invention will be better understood from the following description taken in connection with the accompanying drawing in which:

Fig. 1 represents an exploded view of a blade element made in accordance with the invention and the rim portion of a turbine wheel to which the blade element is to be attached;

Fig. 2 is an end view of part of a turbine wheel embodying the invention; and

Fig. 3 is a sectional view taken along the lines 3—3 of Fig. 2.

Referring to the drawing, 1 indicates the hub, 2 the web, 3 the rim, and 4 the buckets of a turbine wheel. In the present instance, a shaft 5 is shown as being formed integral with the hub 1.

The bucket or blade element 4 comprises a cast or forged airfoil portion 7 having an integral platform 8 which is adapted to be resistance flash welded to a separate base 9 of different material before the bucket is welded to the wheel rim 3. If desired, the airfoil portion may be forged to shape after the resistance flash welding step. The airfoil portion 7 and integral platform 8 are formed from a high temperature alloy which exhibits good forgability or casting characteristics but poor metal arc welding characteristics. One such material, a cobalt alloy which has been used for the high temperature buckets has the following composition:

| | Percent |
|---|---|
| C | 0.35 |
| Cr | 27.00 |
| Mo | 5.50 |
| Co | 60.40 |
| Ni | 2.75 |
| Fe | 2.00 |
| Mn | 1.00 |
| Si | 1.00 |

Although this and similar materials show poor metal arc welding characteristics, they can be resistance flash-welded with relative ease. The separate base 9 is therefore attached to the integral platform 8 by resistance flash-welding as shown in Figs. 2 and 3. The base 9 is of a material which exhibits good metal arc-welding characteristics but which would not be suitable for the airfoil portion 7 in that it has poor casting and forging characteristics. One such material is an iron alloy of the following composition:

| | Percent |
|---|---|
| C | 0.09 |
| Cr | 16.00 |
| Ni | 25.00 |
| Mo | 6.25 |
| Fe | 50.50 |
| N | 0.15 |

By flash-welding a separate base 9 of this material to the integral platform 8, a bucket is provided which may be readily metal arc welded to the turbine rotor wheel 2. The bucket base 9 is provided with centrally located projections 15 having curved sidewalls 16 and the wheel rim 2 is provided with an annular centrally located projection 18 having curved sidewalls 19. The curved sidewalls 16 and 19 are complementary and provide annular grooves in which fused metal may be deposited by any suitable welding method either by a single pass or plurality of passes whereby successive layers of fused metal are deposited one after another. Figs. 2 and 3 show the buckets 4 attached to the wheel, the weld being indicated at 20.

It should be understood that the invention is not limited to the specific materials mentioned above and that any material exhibiting the characteristics mentioned may be used in practicing the invention. Another combination in addition to the one given above that has been found satisfactory is an airfoil portion of a different cobalt alloy having the following composition:

| | Percent |
|---|---|
| C | 0.40 |
| Cr | 20.00 |
| Ni | 20.00 |
| Co | 43.70 |
| Mo | 4.00 |
| W | 4.00 |
| Fe | 2.80 |
| Cb | 3.75 |

An airfoil portion of the above material has been successfully resistance flash-welded to a base portion having the following nickel alloy composition:

| Element | Percent |
|---|---|
| C | 0.10 |
| Ni | 65.00 |
| Mo | 28.00 |
| Fe | 5.00 |
| V | 0.40 |

While two particular embodiments of the invention have been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. The method of manufacturing a composite article comprising the steps of: forming a first body of a cobalt alloy having poor arc welding characteristics; forming second and third bodies of an alloy having good arc welding characteristics and whose principal element is selected from a group consisting of iron, nickel and cobalt; joining the first and second bodies by resistance flash welding; and joining the second and third bodies by metal arc welding.

2. The method in accordance with claim 1 wherein the cobalt alloy having poor arc welding characteristics is an alloy containing about 43–61 percent cobalt.

3. The method in accordance with claim 1 wherein said first body is composed of:

| Element | Percent |
|---|---|
| C | 0.35–0.40 |
| Ni | 2.75–20 |
| Cr | 20–27 |
| Mo | 4.0–5.5 |
| Co | 43.7–60.4 |
| Fe | 2–2.8 |
| W | 0–4.0 |
| Cb | 0–3.75 |
| Mn | 1.0 max. |
| Si | 1.0 max. | and said second body is composed of:

| Element | Percent |
|---|---|
| C | 0.09–0.10 |
| Cr | 0–16 |
| Ni | 25–65 |
| Mo | 6–28 |
| Fe | 5–51 |
| V | 0–0.4 |
| N | 0–0.15 |

4. The method of manufacturing a rotor wheel with integral blade elements comprising: forming a plurality of airfoil portions of a cobalt alloy having poor arc welding characteristics; forming a base portion for each of the airfoil portions of an alloy having good arc welding characteristics and whose principal element is selected from a group consisting of iron, nickel and cobalt; joining the airfoil and the base portions by resistance flash welding to form a blade element; forming a wheel having a rim portion to carry the blade elements; and joining the base portions to the rim portion by metal arc welding.

5. The method in accordance with claim 4 wherein the cobalt alloy having poor arc welding characteristics is an alloy containing about 43–61 percent cobalt.

6. The method in accordance with claim 4 wherein said airfoil portions are composed of:

| Element | Percent |
|---|---|
| C | 0.35–0.40 |
| Cr | 20–27 |
| Ni | 2.75–20 |
| Mo | 4.0–5.5 |
| Co | 43.7–60.4 |
| Fe | 2–2.8 |
| W | 0–4.0 |
| Cb | 0–3.75 |
| Mn | 1.0 max. |
| Si | 1.0 max. | and said base portion is composed of:

| Element | Percent |
|---|---|
| C | 0.09–0.10 |
| Cr | 0–16 |
| Ni | 25–65 |
| Mo | 6–28 |
| Fe | 5–51 |
| V | 0–0.4 |
| N | 0–0.15 |

7. The method of manufacturing a blade element adapted to be metal arc welded to a wheel rim comprising: forming an airfoil portion of a cobalt alloy having poor arc welding characteristics; forming a base portion for the airfoil portion of an alloy having good arc welding characteristics and whose principal element is selected from the group consisting of iron, nickel and cobalt; and joining the airfoil portion to the base portion by resistance flash welding.

8. The method in accordance with claim 7 wherein the cobalt alloy having poor arc welding characteristics is an alloy containing about 43–61 percent cobalt.

9. The method in accordance with claim 7 wherein said airfoil portion is composed of:

| Element | Percent |
|---|---|
| C | 0.35–0.40 |
| Cr | 20–27 |
| Ni | 2.75–20 |
| Mo | 4.0–5.5 |
| Co | 43.7–60.4 |
| Fe | 2–2.8 |
| W | 0–4.0 |
| Cb | 0–3.75 |
| Mn | 1.0 max. |
| Si | 1.0 max. | and said base portion is composed of:

| Element | Percent |
|---|---|
| C | 0.09–0.10 |
| Cr | 0–16 |
| Ni | 25–65 |
| Mo | 6–28 |
| Fe | 5–51 |
| V | 0–0.4 |
| N | 0–0.15 |

10. A composite blade element adapted to be metal arc welded to a rotor wheel rim comprising: an airfoil portion of a cobalt alloy having poor arc welding characteristics; and a base portion of an alloy having good arc welding characteristics and whose principal element is selected from the group consisting of iron, nickel and cobalt.

11. The composite bucket according to claim 10 wherein the cobalt alloy having poor arc welding characteristics is an alloy containing about 43–61 percent cobalt.

12. The method in accordance with claim 10 wherein said airfoil portion is composed of:

|    | Percent |
|----|---------|
| C  | 0.35–0.40 |
| Cr | 20–27 |
| Ni | 2.75–20 |
| Mo | 4.0–5.5 |
| Co | 43.7–60.4 |
| Fe | 2–2.8 |
| W  | 0–4.0 |
| Cb | 0–3.75 |
| Mn | 1.0 max. |
| Si | 1.0 max. | and said base portion is composed of:

|    | Percent |
|----|---------|
| C  | 0.09–0.10 |
| Cr | 0–16 |
| Ni | 25–65 |
| Mo | 6–28 |
| Fe | 5–51 |
| V  | 0–0.4 |
| N  | 0–0.15 |

References Cited in the file of this patent

UNITED STATES PATENTS

| 2,137,097 | Sateren | Nov. 15, 1938 |
| 2,384,919 | Huber | Sept. 18, 1945 |